UNITED STATES PATENT OFFICE.

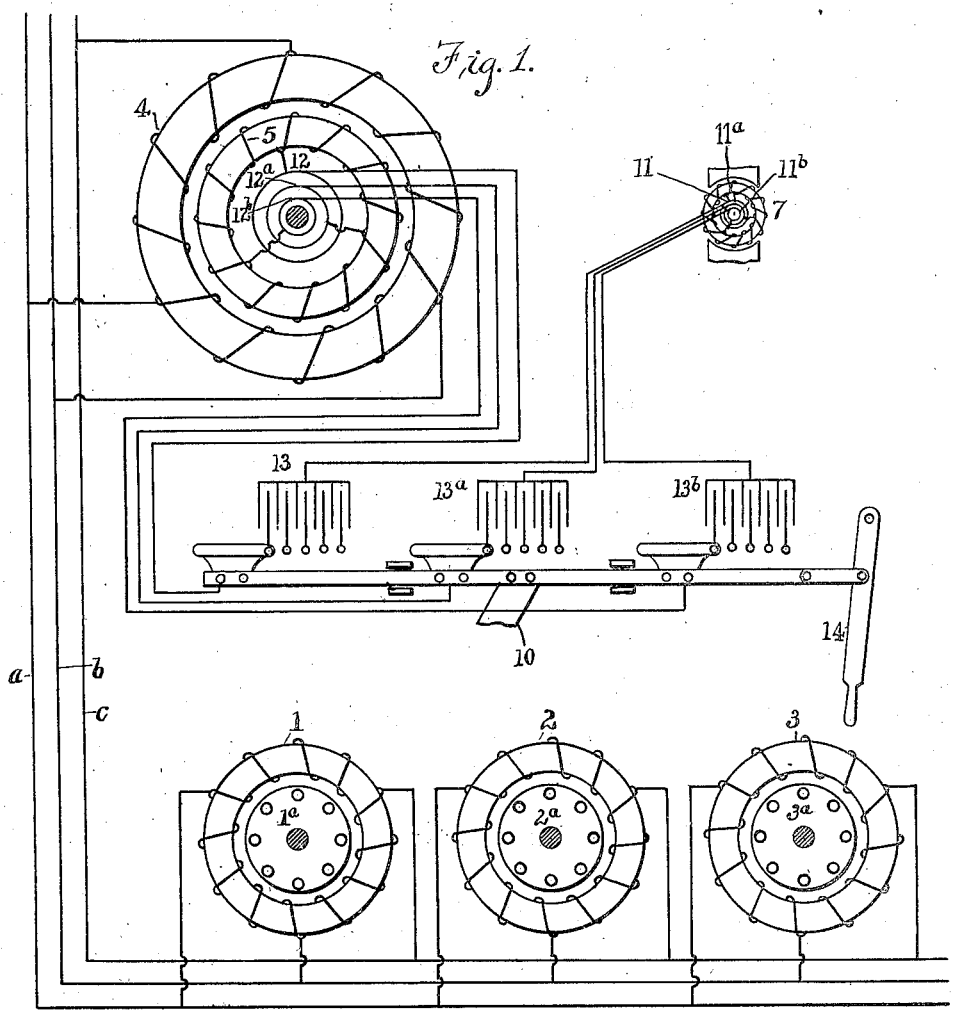

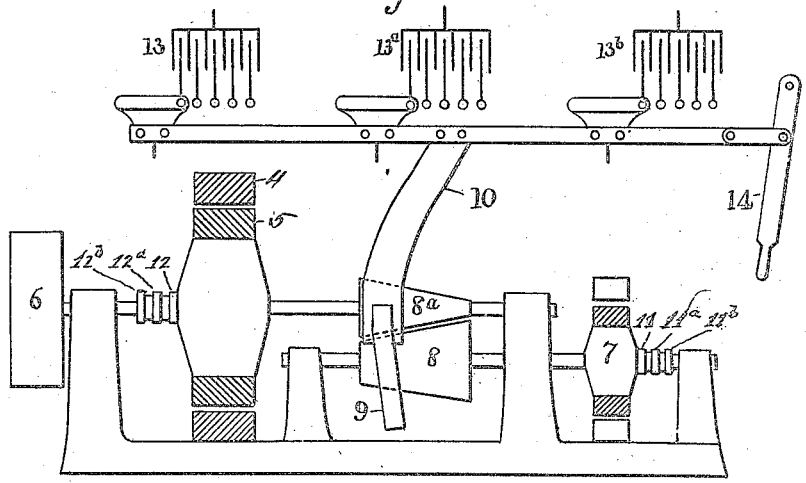
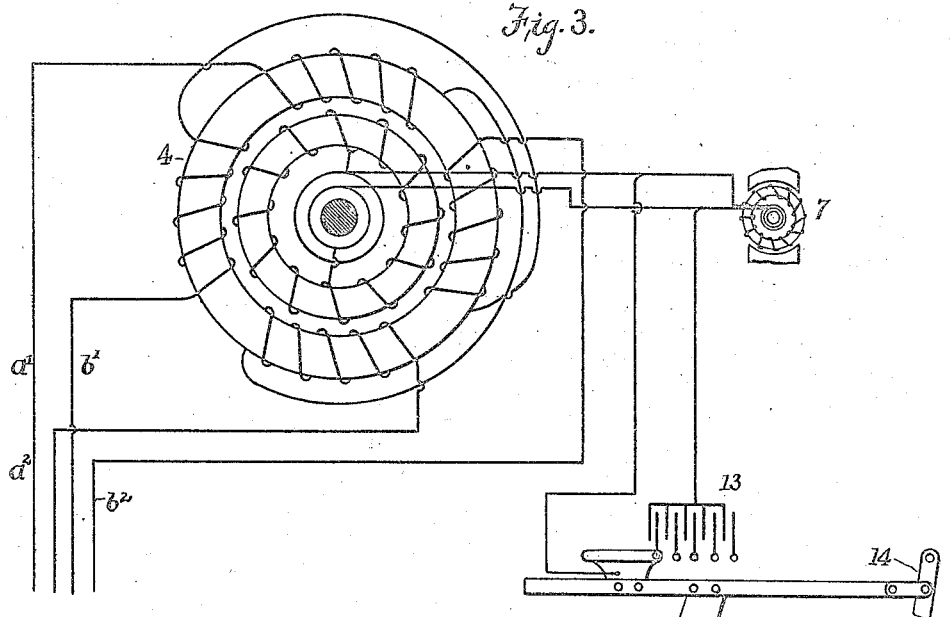

CHARLES S. BRADLEY, OF AVON, NEW YORK, ASSIGNOR TO THE GENERAL ELECTRIC COMPANY, OF NEW YORK.

ALTERNATING-CURRENT GENERATOR.

SPECIFICATION forming part of Letters Patent No. 591,267, dated October 5, 1897.

Application filed June 22, 1896. Serial No. 596,425. (No model.)

*To all whom it may concern:*

Be it known that I, CHARLES S. BRADLEY, a citizen of the United States, and a resident of Avon, in the county of Livingston, in the State of New York, have invented certain new and useful Improvements in Alternating-Current Generators, of which the following is a specification.

This invention relates to dynamo-electric generators, the object being to generate a current or currents of variable frequency or rate of alternation with a prime mover operating at practically constant speed.

The invention is especially designed for service in connection with induction-motors which when provided with secondary windings of constant resistance require a low frequency and electromotive force in starting and an increased frequency and electromotive force as the speed rises.

In carrying out my invention I develop a rotary magnetic field by currents furnished by an exciter in one element of the generator and drive said exciter by the prime mover at a variable speed, thus producing any desired speed of the magnetic poles with relation to the coöperating element of the generator, the winding of which connects with a distribution-circuit containing the induction-motors. The connections with the exciter are so arranged that the direction of polar travel of the rotary field is opposite to the bodily movement of the core in which said rotary field is set up, thus establishing a differential speed of polar travel with relation to the generating-winding. The circuit including the magnetizing generator-winding is provided with adjusting devices for varying its capacity or inductance, or both, to render the circuit resonant to the different rates of alternation which may be set up by the exciter. The result is preferably effected by adjustable condensers controlled by the same device which regulates the speed of the exciter, so that resonance or approximate resonance may be maintained in the exciter-circuits throughout its working range of speed.

The invention is especially applicable to plants in which a number of motors are simultaneously varied in speed—as, for example, in operating cars or trains of cars. In such cases the organization I provide forms a self-contained equipment of the type, for example, described in a prior patent granted to me, No. 399,372, dated March 12, 1889.

The invention comprises in its broadest aspect a variable-rate generator operated by a prime mover of constant or approximately constant speed.

It comprises also a method of varying the rate of an alternating-current generator by developing a rotary field of variable speed, and also in rendering the circuits resonant
to the several speed adjustments.

It comprises also means for developing a variable-speed rotary field in a generator and rendering the circuits resonant to the several speed adjustments.

It comprises also more specific features, which will be hereinafter fully described, and will be definitely indicated in the claims.

In the accompanying drawings, which diagrammatically illustrate my invention, Figure 1 is a diagram of the invention, the speed-varying devices of the exciter being omitted for clearness of illustration. Fig. 2 is a diagram of the speed-varying devices for the exciter, and Fig. 3 illustrates a modified form of generator-winding.

1 2 3 represent a series of induction-motors, in the primary element of which is set up a rotary magnetic field by polyphase currents in the mains $a\ b\ c$. The motor-secondaries are provided with closed circuits, which may be of constant resistance. These are shown at $1^a\ 2^a\ 3^a$ as simple squirrel-cage windings.

The mains may be charged with polyphase currents of any order, as triphase, quarter-phase, &c. Fig. 1 shows the system organized for triphase currents and Fig. 3 for quarter-phase currents.

$a\ b\ c$ are mains connecting with three symmetrical points of the generating-winding of a generator 4. The magnetizing-winding 5 of this generator is driven by a prime mover acting, for example, on a pulley 6. (See Fig. 2.)

7 is an exciter which is geared or otherwise connected with the shaft which carries the winding 5 by a variable-speed device (shown as two cone-pulleys 8 8ª) with an intervening coupler or belt 9 and a shipper 10.

The windings of the generator and exciter are shown diagrammatically, similar reference-figures being used to show corresponding parts. The field-magnet of the exciter may be charged by a direct current or in any suitable way. Its armature is tapped at a plurality of symmetrical points leading through ring-contacts 11 11ª 11ᵇ, upon which bear brushes leading to the magnetizing-winding of the generator through corresponding brushes and ring-contacts 12 12ª 12ᵇ. Between the exciter-armature and the generator are devices 13 13ª 13ᵇ for varying the capacity inductance product of the circuits.

By a proper adjustment the circuits may be rendered resonant to any rate of alternation, and when so adjusted the opposing effect of inductance is eliminated and electromotive force and resistance are the only factors affecting the strength of current and a large current will flow in the circuits, permitting an exciter of small size to be employed to set up the rotary field of the generator.

Resonance may be established by adjusting either the capacity or the inductance of the circuits, the product of the capacity in microfarads and the inductance in henries varying inversely as the square of the number of alternations per second in the magnetizing-winding. I prefer to use a condenser or condensers as the adjusting element, and one such is shown for each branch of the triphase circuit at 13 13ª 13ᵇ, being arranged so that more or less surface may be cut in by the same operation of the handle 14 which throws the shipper and speed-regulator. The parts are so arranged that the capacity will be least when the motors are being started, since the rate supplied to the motor in starting should be slow, which requires the speed of the rotary field to be close to that of the revolving core—that is to say, the rotary field, and therefore the exciter, should have a maximum speed and maximum rate, which will be in tune with the circuit when the latter has the least capacity. As the motors rise in speed the capacity is increased by a movement of the controlling-handle, and the rate of the exciter is slowed down by the accompanying movement of the shipper.

The brushes 12 12ª 12ᵇ are connected with the exciter-leads in such order as to develop a rotary magnetic field on the magnetizing-winding of the generator in an opposite direction to the motion imparted to the core by the shaft. Thus the actual speed of travel of the rotary-field poles relatively to the generating-winding is differential and may be of any value from zero to the maximum difference of speed. Thus it will be seen that in starting up the handle may be thrown to the left, giving a high speed to the exciter-armature and a low speed of cutting of the generating-winding by the lines of the rotary field by reason of the close approximation in speed of the poles and the core and in opposite directions. The motors then start with their primaries excited by currents of low rate and low electromotive force. The handle is then gradually shifted to the right, producing an increased rate and electromotive force in the circuits a b c and driving the induction-motors at increased speed.

It will of course be understood that it is relative motion of the two elements of the generator which controls the generation of current and that either may be the rotating element, and that the arrangement of the two elements as to outside and inside parts is also reversible. It is not necessary that the exciter should deliver polyphase currents to the magnetizing-circuit, as single-phase currents will set up a rotary magnetic field under the reaction of the coöperating element of the generator, especially when induction-motors are connected with the distribution-circuit. Such an arrangement is shown in Fig. 3 of the drawings, in which also the generating-circuits are shown as quarter-phase. In Fig. 1 the condensers are shown in series relation to the coils of the magnetizing-winding. They may also be in multiple-arc relation, as shown in Fig. 3.

Having thus described my invention, what I claim as new, and desire to secure by Letters Patent, is—

1. An alternating-current electric generator provided with means for varying the rate of alternation, and adjusting devices to vary the product of capacity and inductance to produce resonance at the several rates.

2. An alternating-current generator provided with a rotary-field winding on its magnetizing element, an alternating-current exciter for furnishing the magnetizing-current, and means for varying the rate of the exciter.

3. An alternating-current generator provided with a rotary-field winding on its magnetizing element, a polyphase-exciter, and means for varying the rate of the exciter.

4. An alternating-current generator provided with a rotary-field winding on its magnetizing element, an exciter of variable rate, and adjusting devices for varying the product of capacity and inductance to produce electrical resonance.

5. The method of varying the rate of an alternating current consisting in causing a differential motion of the magnetic poles set up by a charging-current and the core magnetized by said charging-current relatively to the generating-winding, and varying said differential motion.

6. The method of varying the rate of an alternating-current generator, consisting in developing a rotary magnetic field in one winding and varying the rate of rotation of the field.

7. The method of varying the rate of an alternating-current generator consisting in developing a rotary magnetic field in its magnetizing-winding, and varying the rate of rotation of the field, and simultaneously adjusting the circuits for electrical resonance at the different rates.

8. An alternating-current generator comprising a rotary-field winding driven by a prime mover, an exciter for charging the field, and means for varying the speed of the exciter.

9. An alternating-current generator comprising a rotary-field winding driven by a prime mover, an exciter for charging the field, means for varying the speed of the exciter, and adjusting devices for varying the capacity inductance product of the field-circuits to produce electrical resonance.

10. The combination of an induction-motor, a generator having its generating-winding connected therewith, and a rotary-field winding on its magnetizing element, and means for varying the speed of the rotary field.

11. The combination of an induction-motor, an induction-generator having its secondary connected with said motor and a rotary-field winding on its primary, means for varying the speed of the rotary field, and adjusting devices for varying the capacity inductance product of the rotary-field circuits to vary the speed of the motor.

In testimony whereof I have hereunto subscribed my name this 22d day of May, A. D. 1896.

CHARLES S. BRADLEY.

Witnesses:
CHAS. EDGAR MILLS,
ROBT. H. READ.